(12) United States Patent
Kim

(10) Patent No.: US 7,140,486 B2
(45) Date of Patent: Nov. 28, 2006

(54) DEVICE FOR MONITORING ABNORMALITY IN A CHAIN

(75) Inventor: Yong Sub Kim, Masan-si (KR)

(73) Assignee: Otis Elevator Company, Farmington, CT (US)

( * ) Notice: Subject to any disclaimer, the term of this patent is extended or adjusted under 35 U.S.C. 154(b) by 171 days.

(21) Appl. No.: 11/019,252

(22) Filed: Dec. 17, 2004

(65) Prior Publication Data

US 2005/0187053 A1 Aug. 25, 2005

(30) Foreign Application Priority Data

Dec. 19, 2003 (KR) .................. 10-2003-0093594

(51) Int. Cl.
*B65G 43/00* (2006.01)
(52) U.S. Cl. .................. 198/810.03; 198/810.02; 198/810.04; 198/502.4
(58) Field of Classification Search ............ 198/502.1, 198/502.4, 810.01, 810.02, 810.03, 810.04; 73/828
See application file for complete search history.

(56) References Cited

U.S. PATENT DOCUMENTS

| | | | | |
|---|---|---|---|---|
| 2,395,599 A | * | 2/1946 | Webb et al. | ............ 198/810.01 |
| 2,438,068 A | * | 3/1948 | Mercier | ............ 198/813 |
| 2,635,736 A | * | 4/1953 | Rust | ............ 198/810.04 |
| 3,589,504 A | * | 6/1971 | Blough | ............ 198/719 |
| 3,612,221 A | | 10/1971 | Branham | |
| 3,963,115 A | | 6/1976 | Teske et al. | |
| 3,998,317 A | | 12/1976 | Stinnett | |
| 4,119,055 A | | 10/1978 | Ward et al. | |
| 4,245,739 A | | 1/1981 | Hartley et al. | |
| 4,259,918 A | * | 4/1981 | Ward et al. | ............ 198/502.4 |
| 4,274,783 A | | 6/1981 | Eineichner et al. | |
| 4,305,513 A | | 12/1981 | Voelz | |
| 4,372,172 A | * | 2/1983 | Gombocz et al. | ....... 73/862.392 |
| 4,407,162 A | | 10/1983 | Landenberger | |
| 4,499,971 A | | 2/1985 | Luebrecht et al. | |
| 4,508,205 A | | 4/1985 | Aulagner et al. | |
| 4,564,099 A | * | 1/1986 | Uozumi | ............ 198/323 |
| 4,648,486 A | | 3/1987 | Kayser et al. | |
| 4,657,131 A | | 4/1987 | Brychta et al. | |
| 4,797,662 A | | 1/1989 | Graham et al. | |
| 4,863,006 A | | 9/1989 | Kotkata et al. | |
| 5,002,177 A | | 3/1991 | Winning | |
| 5,143,206 A | * | 9/1992 | Hoover | ............ 198/810.04 |
| 5,291,131 A | | 3/1994 | Suzuki et al. | |
| 5,337,885 A | | 8/1994 | Mills et al. | |
| 5,563,392 A | | 10/1996 | Brown et al. | |

(Continued)

FOREIGN PATENT DOCUMENTS

GB  2377918 A  1/2003

(Continued)

OTHER PUBLICATIONS

Korean Office Action and English translation dated Apr. 4, 2006, received in Korean counterpart Application No. 10-2003-93594, (3 pages).

*Primary Examiner*—Douglas Hess

(57) ABSTRACT

A chain monitoring device is provided with a base, guiding posts fixed to the base, a member movable along the guiding posts, a chain sprocket rotatable with a chain with its teeth being engaged into the chain, springs for resiliently urging the member for the engagement of the teeth into the chain, and a sensor detecting a change in position of the member. The chain sprocket is rotatably mounted to the member.

6 Claims, 3 Drawing Sheets

U.S. PATENT DOCUMENTS

| | | |
|---|---|---|
| 5,997,423 A | 12/1999 | Kwon |
| 6,029,798 A | 2/2000 | Miller |
| 6,137,974 A * | 10/2000 | Williams et al. ............ 399/165 |
| 6,435,035 B1 | 8/2002 | Kubsik et al. |
| 6,786,325 B1 * | 9/2004 | Powell ....................... 198/807 |
| 6,851,546 B1 * | 2/2005 | Lodge ..................... 198/502.1 |
| 6,964,203 B1 * | 11/2005 | Crasset ........................ 73/854 |

FOREIGN PATENT DOCUMENTS

| | | |
|---|---|---|
| KR | 1990-17273 | 10/1990 |
| KR | 1998-21799 | 7/1998 |
| WO | WO 2003064963 A2 | 8/2003 |

* cited by examiner

DEVICE FOR MONITORING ABNORMALITY IN A CHAIN

FIELD OF THE INVENTION

The present invention generally relates to a device for monitoring abnormality in a chain, and more particularly to a device for monitoring abnormality in the operation of a chain used for a main power transmission of a parking system.

BACKGROUND OF THE INVENTION

A chain has been used in various known systems including a parking system since it enables an accurate power transmission without any slippage. In a conventional parking system provided with a driving unit having a motor, the power from the motor is normally transmitted to a lift via a chain, for example.

In the parking system, the chain should be frequently monitored for any abnormality because breakage or cutting of the chain may cause serious accidents. However, manually checking the status of the chain, which is usually positioned in a place not easily seen or accessible, is burdensome. For this reason, chain-monitoring devices that can constantly and automatically monitor the status of the chain have been proposed.

FIG. 1 illustrates a prior art device for monitoring abnormality in a chain used in a parking system. The chain-monitoring device 10 is provided with a plate 6, a pair of guiding posts 2, a member 12 and a sensor 4.

As can be seen in FIG. 1, the plate 6 is attached to a stationary component of the parking system. One end of each guiding post 2 is attached to the plate 6, while the other end thereof remains unattached and thus constitutes a free end. The member 12 retained around the guiding posts 2 is vertically movable along the guiding posts 2. Stoppers 14 are formed at the free ends of the guiding posts 2 in order to limit a downward movement of the member 12. A pair of springs 8 vertically biases the member 12 downward for contact with a chain 16. The sensor 4 located on the plate 6 serves to measure the distance between the plate 6 and member 12 by sensing the surface 12a of the member 12.

In the prior art chain-monitoring device 10 described above, the member 12 moves downward when the chain 16 is cut, broken down, or slackened. The change in distance due to the downward movement of the member 12 is detected by the sensor 4. The sensor 4 then informs a controller (not shown), for example, of the abnormality in the chain 16.

In the prior art chain-monitoring device 10, however, since the member 12 is kept in a sliding contact with an uneven surface of the chain 16, the member 12 tends to seriously vibrate. This causes unwanted noise and the portion of the member 12 contacting the chain 16 becomes easily worn out. Further, as the distance between the plate 6 and the member 12 increases due to the wear of the member 12, the sensor 4 may issue a wrong signal that the chain 16 is malfunctioning.

SUMMARY OF THE INVENTION

It is, therefore, an object of the present invention to provide a chain-monitoring device which can produce the advantageous effects of reduced wear, breakage, vibration and noise, while being capable of precisely detecting the status of a chain.

The above object is accomplished with a chain-monitoring device comprising: a base; a guiding post attached to the base; a member movable along the guiding post; a rotating body rotatable with a chain with its teeth being engaged into the chain, the rotating body rotatably mounted to the member; an urging means for resiliently urging the member for the engagement of the teeth of the rotating body into the chain; and a detecting means for detecting a change in position of the member.

In accordance with one aspect of the present invention, said urging means is a spring having a first end supported by the base and a second end supported by the member, wherein the spring is retained around the guiding post.

In accordance with another aspect of the present invention, said detecting means is a sensor provided on the base and measuring a distance between the member and the base.

BRIEF DESCRIPTION OF DRAWINGS

The above object and features of the present invention will become more apparent from the following description of the preferred embodiments together with the accompanying drawings, wherein.

DETAILED DESCRIPTION OF THE PRESENT INVENTION

The embodiments of the present invention will now be described with reference to the accompanying drawings.

Figure 1:
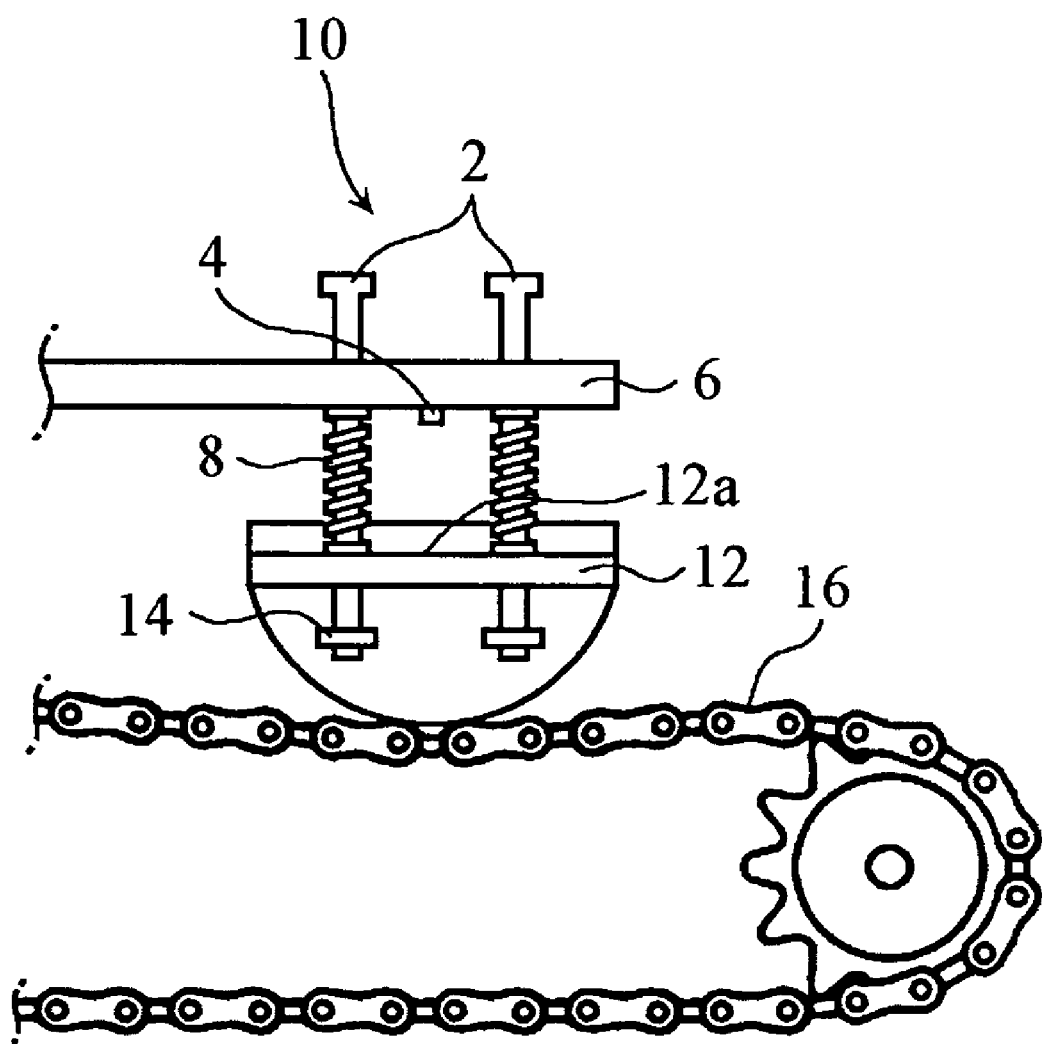
FIG. 1 illustrates a prior art chain-monitoring device.
Figure 2:
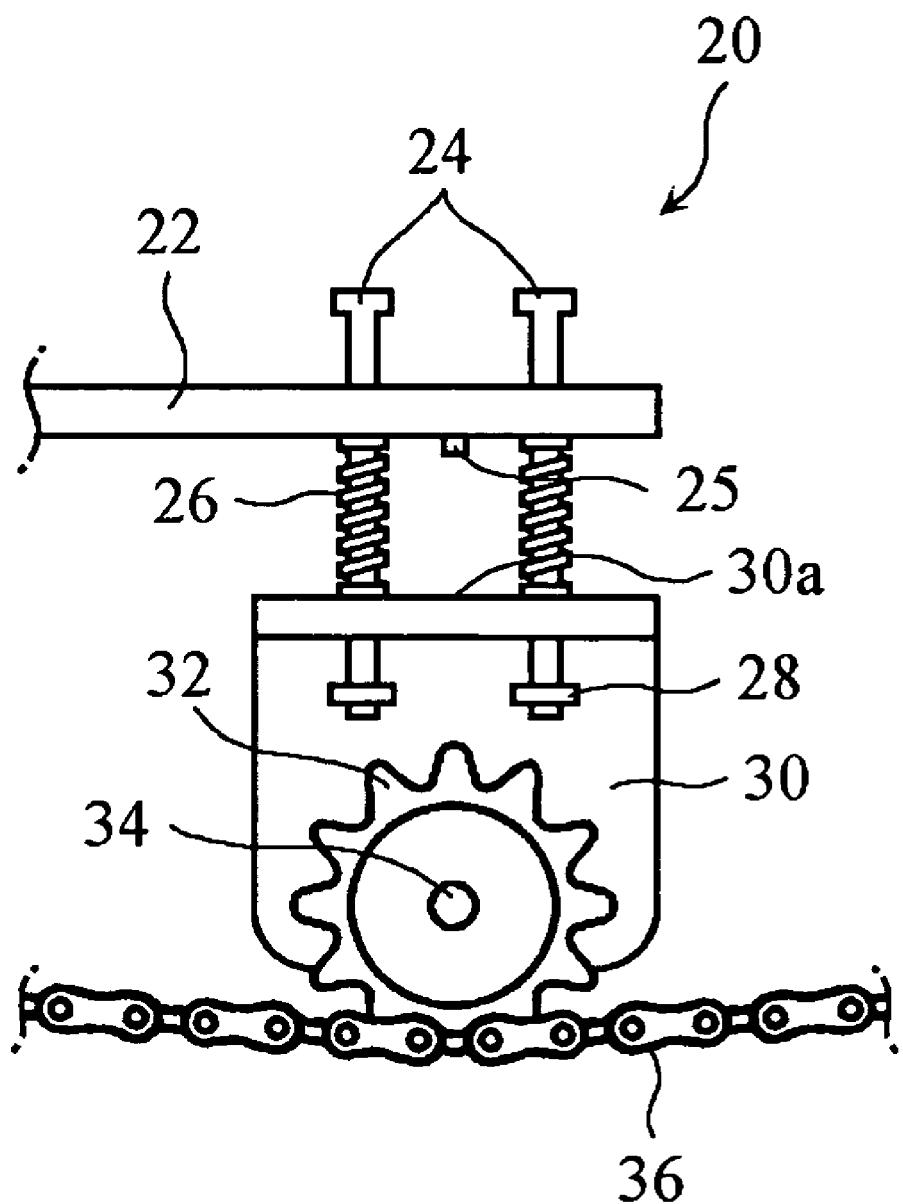
FIG. 2 is a frontal view illustrating a chain-monitoring device constructed in accordance with a preferred embodiment of the present invention.
Figure 3:
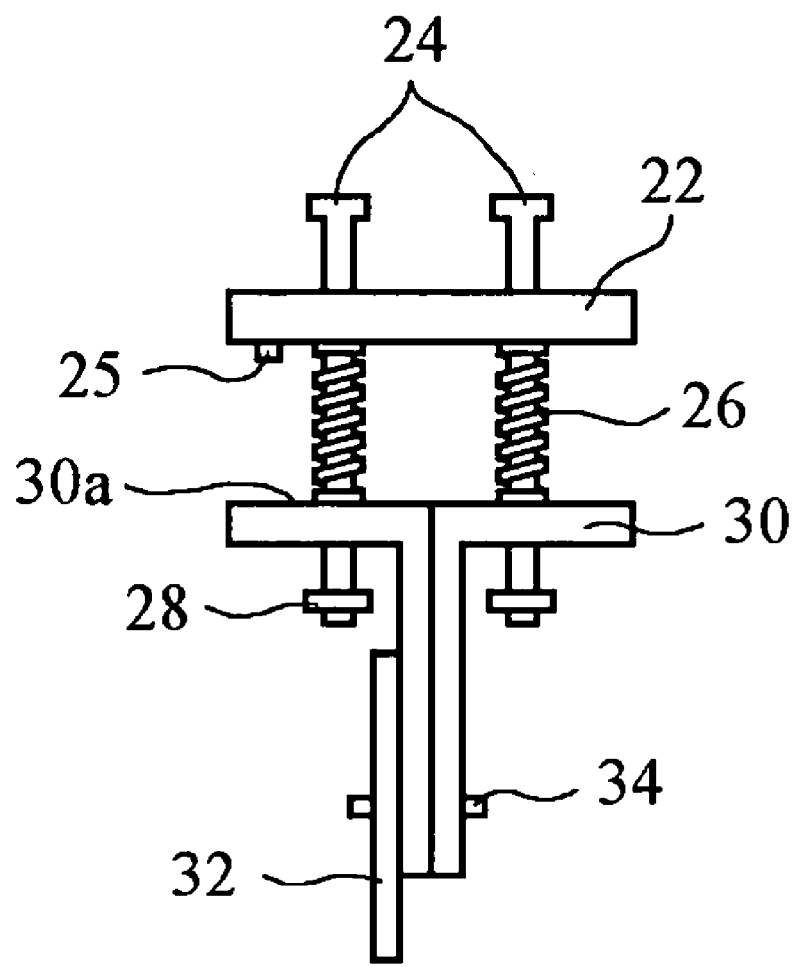
FIG. 3 is a side view illustrating the chain-monitoring device of FIG. 1.

As shown in FIGS. 2 and 3, the chain-monitoring device 20 includes a base or plate 22, two pairs of guiding posts 24, two pairs of springs 26, a member 30, a rotating body 32 and a sensor 25.

The base or plate 22 is attached to a stationary part of a system (e.g., a parking system). The guiding posts 24 each have first and second ends, in which the first ends are fixed to the plate 22 while the second ends remain unattached to thereby form free ends. Although there are two pairs of guiding posts 24 in the preferred embodiment, it should be expressly stated herein that only one pair of guiding posts 24 may be used in lieu thereof.

The member 30 retained around guiding posts 24 is vertically movable along the guiding posts 24. Stoppers 28 are provided at the second ends of the guiding posts 24 to limit a downward movement of the member 30. In the embodiment, washers are used as stoppers 28. The springs 26 are retained around the guiding posts 24 between the member 30 and the plate 22 in order to resiliently urge the member 30 toward the chain 36.

The member 30 of the present invention is equipped with a rotating body 32 having teeth that are engageable with the chain 36. The rotating body 32 is rotatably mounted to an end of the member 30 via a pin member 34. In the preferred embodiment, a chain sprocket is used as the rotating body 32. The sensor 25 provided on the plate 22 detects a change in distance between the member 30 and the plate 22. In order to provide detection points for the sensor 4, the member 30 is provided with a detection surface 30a facing the plate 22 and substantially extending in parallel relationship with the plate 22. The sensor 25 may be installed on other stationary parts of the system instead of the plate 22.

The operations of the present chain-monitoring device 20 configured and constructed in accordance with the above manner will be described hereunder.

As shown in FIG. 2, since the springs 26 urge the member 30 toward the chain 36, the rotating body 32 is in rolling contact with the chain 36, with its teeth being engaged into links of the chain 36. The rotating body 32 rotates as the chain 36 moves.

The distance between the plate 22 and the member 30 is detected by the sensor 25, which sends signals about the distance to a controller (not shown), for example. The distance is hardly changed during a normal operation of the chain 36. Even if the distance is changed, it varies in a small range. When the controller receives the signals corresponding to the distance within the range, it determines that the chain 36 is being operated in its normal state.

When the chain 36 is cut, broken down, or exceedingly slackened, the member 30 moves toward the chain 36 by the springs 26, with the distance between the member 30 and the plate 22 being changed in a large amount beyond the range. The change of distance is informed to the controller via the sensor 25 and then the controller may inform an operator of the abnormality of the chain 36 in various manners. For example, an alarm signal may be emitted in a form of sound or light or it can be displayed in a monitor. Further, the controller can be adapted to perform an emergency program (e.g., stopping the driving motor), while informing the operator of occurrence of emergency situation.

The chain-monitoring device in accordance with the present invention can be applied to various systems such as a parking apparatus or an elevator system.

The chain-monitoring device of the present invention has a significantly reduced noise compared to the prior art chain-monitoring device. Further, the member has an increased endurance, since it is connected to the chain through a rotating body that is in rolling contact with the chain.

While the present invention has been shown and described with respect to the particular embodiment, it will be apparent to those skilled in the art that many exchanges and modifications may be made without departing from the spirit and scope of the invention as defined in the appended claims.

What is claimed is:

1. A chain-monitoring device comprising:
   a rotating body rotatable with a chain and having teeth being engaged into the chain;
   a member to which the rotating body is rotatably mounted;
   a base;
   a guiding post supporting the member movably relative to the base;
   an urging means for resiliently urging the member for the engagement of the teeth of the rotating body into the chain; and
   a detecting means for detecting a change in position of the member.

2. The device of claim 1, wherein the guiding post is attached to a house, and the member is movable along the guiding post.

3. The device of claim 1. wherein said urging means is a spring whose one end is supported by the base with the other end being supported by the member, and the spring retained around the guiding post.

4. The device of claim 1, wherein said rotating body is a chain sprocket.

5. The device of claim 1, wherein said detecting means is a sensor provided on the base and measuring a distance between the member and the base.

6. The device of claim 5, wherein said member has a surface facing the base and extending in parallel relationship with the base.

* * * * *